(12) United States Patent
Ott et al.

(10) Patent No.: US 10,751,797 B2
(45) Date of Patent: Aug. 25, 2020

(54) ADDITIVE MANUFACTURE SYSTEM WITH A CONTAINMENT CHAMBER AND A LOW PRESSURE OPERATING ATMOSPHERE

(71) Applicant: United Technologies Corporation, Farmington, CT (US)

(72) Inventors: Joe Ott, Enfield, CT (US); Sergey Mironets, Charlotte, NC (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 16/193,203

(22) Filed: Nov. 16, 2018

(65) Prior Publication Data

US 2019/0084041 A1 Mar. 21, 2019

Related U.S. Application Data

(63) Continuation of application No. 14/957,941, filed on Dec. 3, 2015, now abandoned.
(Continued)

(51) Int. Cl.
| | | |
|---|---|---|
| *B22F 3/10* | (2006.01) | |
| *B22F 3/105* | (2006.01) | |
| *B33Y 10/00* | (2015.01) | |
| *B33Y 30/00* | (2015.01) | |
| *B33Y 40/00* | (2020.01) | |

(Continued)

(52) U.S. Cl.
CPC .......... *B22F 3/1007* (2013.01); *B22F 3/1055* (2013.01); *B29C 64/20* (2017.08); *B29C 64/35* (2017.08); *B29C 64/386* (2017.08); *B33Y 10/00* (2014.12); *B33Y 30/00* (2014.12); *B33Y 40/00* (2014.12); *B22F 2003/1056* (2013.01); *B22F 2003/1057* (2013.01); *B22F 2003/1059* (2013.01); *B22F 2999/00* (2013.01); *B29C 64/153* (2017.08); *Y02P 10/24* (2015.11); *Y02P 10/295* (2015.11)

(58) Field of Classification Search
CPC .. B22F 3/1007; B22F 3/1055; B22F 2999/00; B22F 2003/1059; B22F 2003/1056; B22F 2003/1057; B22F 3/105; B29C 64/35; B29C 64/386; B29C 64/20; B29C 64/153; B33Y 40/00; B33Y 30/00; B33Y 10/00; Y02P 10/24; Y02P 10/295; B05B 16/00; B01D 2279/51; B01D 46/00; B23K 26/12
See application file for complete search history.

(56) References Cited

U.S. PATENT DOCUMENTS

| | | |
|---|---|---|
| 6,995,334 B1 | 2/2006 | Kovacevic et al. |
| 7,777,155 B2 | 8/2010 | Twelves, Jr. et al. |

(Continued)

FOREIGN PATENT DOCUMENTS

| | | |
|---|---|---|
| CN | 102164696 A | 8/2011 |
| WO | 2014095200 A1 | 6/2014 |

OTHER PUBLICATIONS

Chinese Office Action dated Jan. 2, 2019 issued in corresponding Chinese Patent Application No. 201510877888.1.

*Primary Examiner* — Nahida Sultana
(74) *Attorney, Agent, or Firm* — Bachman & LaPointe, P.C.

(57) ABSTRACT

A additive manufacturing system includes a containment housing operable to form a containment chamber with a low pressure operating atmosphere and an additive manufacturing build housing within said containment housing.

8 Claims, 2 Drawing Sheets

Related U.S. Application Data

(60) Provisional application No. 62/087,931, filed on Dec. 5, 2014.

(51) Int. Cl.
  *B29C 64/20* (2017.01)
  *B29C 64/386* (2017.01)
  *B29C 64/35* (2017.01)
  *B29C 64/153* (2017.01)

(56) References Cited

U.S. PATENT DOCUMENTS

| | | |
|---|---|---|
| 8,082,966 B2 | 12/2011 | Short |
| 8,221,858 B2 | 7/2012 | Mannella et al. |
| 8,272,424 B2 | 9/2012 | Short |
| 8,383,985 B2 | 2/2013 | Twelves, Jr. et al. |
| 8,488,994 B2 | 7/2013 | Hanson et al. |
| 8,506,836 B2 | 8/2013 | Szuromi et al. |
| 8,570,534 B1 | 10/2013 | Loewgren |
| 8,658,250 B2 | 2/2014 | Batchelder et al. |
| 8,753,105 B2 | 6/2014 | Scott |
| 8,879,957 B2 | 11/2014 | Hanson et al. |
| 2007/0023977 A1 | 2/2007 | Braun et al. |
| 2007/0126157 A1 | 6/2007 | Bredt |
| 2011/0291331 A1* | 12/2011 | Scott .............. B22F 3/1055 264/510 |
| 2013/0108726 A1 | 5/2013 | Uckelmann et al. |
| 2014/0271965 A1 | 9/2014 | Ferrar |
| 2014/0301883 A1 | 10/2014 | Wiesner et al. |
| 2015/0110911 A1 | 4/2015 | Snyder |
| 2015/0174823 A1 | 6/2015 | Wiesner et al. |
| 2018/0111319 A1* | 4/2018 | Brezoczky ........ B22F 3/1055 |
| 2018/0215106 A1* | 8/2018 | McMahon ........... B08B 3/006 |
| 2018/0281284 A1* | 10/2018 | Elgar ................ B29C 31/085 |
| 2019/0262901 A1* | 8/2019 | Huebinger .......... B29C 64/371 |
| 2019/0291184 A1* | 9/2019 | Buller .................. B29C 64/20 |

\* cited by examiner

ADDITIVE MANUFACTURE SYSTEM WITH A CONTAINMENT CHAMBER AND A LOW PRESSURE OPERATING ATMOSPHERE

CROSS-REFERENCE TO RELATED APPLICATIONS

This application is a continuation of U.S. patent application Ser. No. 14/957,941, filed Dec. 3, 2015, which claims the benefit of U.S. Provisional Application Ser. 62/087,931, filed Dec. 5, 2014.

BACKGROUND

The present disclosure relates to an additive manufacturing system, and more particularly, operation of additive manufacturing machines within a vacuum.

Additive Manufacturing (AM) machines typically utilize an inert gas or vacuum environment within the build chamber to reduce potential contamination of the melted material during operation. Electron beam type machines typically utilize a vacuum within the build chamber, while laser powder bed type machines typically utilize a constant flow of inert gas within the build chamber as a vacuum environment may tend to distort the laser beam and thus affect the build.

Although effective, such processing chambers may still allow atmosphere with the associated, moisture, dust, etc., to enter the build chamber. A nearly constant flow of inert gas or vacuum pumping within the build chamber operates to minimize leakage effects, yet still contamination occurs.

SUMMARY

An additive manufacturing system according to one disclosed non-limiting embodiment of the present disclosure includes a containment housing with a low pressure operating atmosphere containment chamber and an additive manufacturing build chamber within the containment housing.

A further embodiment of the present disclosure includes, wherein the containment chamber completely contains an additive manufacturing build housing that defines the build chamber.

A further embodiment of any of the foregoing embodiments of the present disclosure includes, wherein the low pressure operating atmosphere is about $10^{-2}$ to $10^{-4}$ torr partial pressure.

A further embodiment of any of the foregoing embodiments of the present disclosure includes, wherein the low pressure operating atmosphere is about $10^{-3}$ to $10^{-4}$ torr partial pressure.

A further embodiment of any of the foregoing embodiments of the present disclosure includes, wherein the build chamber contains a positive pressure.

A further embodiment of any of the foregoing embodiments of the present disclosure includes, wherein the build chamber receives an inert gas flow.

A further embodiment of any of the foregoing embodiments of the present disclosure includes, wherein the build chamber receives an inert gas flow.

A further embodiment of any of the foregoing embodiments of the present disclosure includes, wherein the inert gas flow is about 10 liters per minute.

A further embodiment of any of the foregoing embodiments of the present disclosure includes a filter system in communication with the build housing.

A further embodiment of any of the foregoing embodiments of the present disclosure includes, wherein the filter system is in communication with an inert gas source to communicate the inert gas into the build housing.

A further embodiment of any of the foregoing embodiments of the present disclosure includes, wherein the filter system is within the containment chamber.

An additive manufacturing system according to one disclosed non-limiting embodiment of the present disclosure includes a containment housing with a low pressure operating atmosphere containment chamber; and an additive manufacturing build housing within the containment chamber, the additive manufacturing build housing in communications with an inert gas flow to form a positive pressure build chamber within the additive manufacturing build housing.

A further embodiment of any of the foregoing embodiments of the present disclosure includes, wherein the low pressure operating atmosphere is about $10^{-3}$ to $10^{-4}$ torr partial pressure during operation.

A further embodiment of any of the foregoing embodiments of the present disclosure includes, wherein the build chamber receives the inert gas flow at about 10 liters per minute.

A further embodiment of any of the foregoing embodiments of the present disclosure includes a filter system in communication with the build housing.

A further embodiment of any of the foregoing embodiments of the present disclosure includes, wherein the filter system is within the containment housing.

A method of operating an additive manufacturing system according to one disclosed non-limiting embodiment of the present disclosure includes additively manufacturing within an additive manufacturing build chamber, the additive manufacturing build chamber within a low pressure operating atmosphere.

A further embodiment of any of the foregoing embodiments of the present disclosure includes, wherein the low pressure operating atmosphere is formed within a containment housing.

A further embodiment of any of the foregoing embodiments of the present disclosure includes, wherein the additive manufacturing build chamber is formed within an the additive manufacturing build housing, the additive manufacturing build housing completely contained within the containment housing.

A further embodiment of any of the foregoing embodiments of the present disclosure includes communicating an inert gas into the additive manufacturing build housing.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The components in the drawings are not necessarily to scale. Moreover, in the drawings, like reference numerals designate corresponding parts throughout the several views. The drawings that accompany the detailed description can be briefly described as follows.

DETAILED DESCRIPTION

Figure 1:
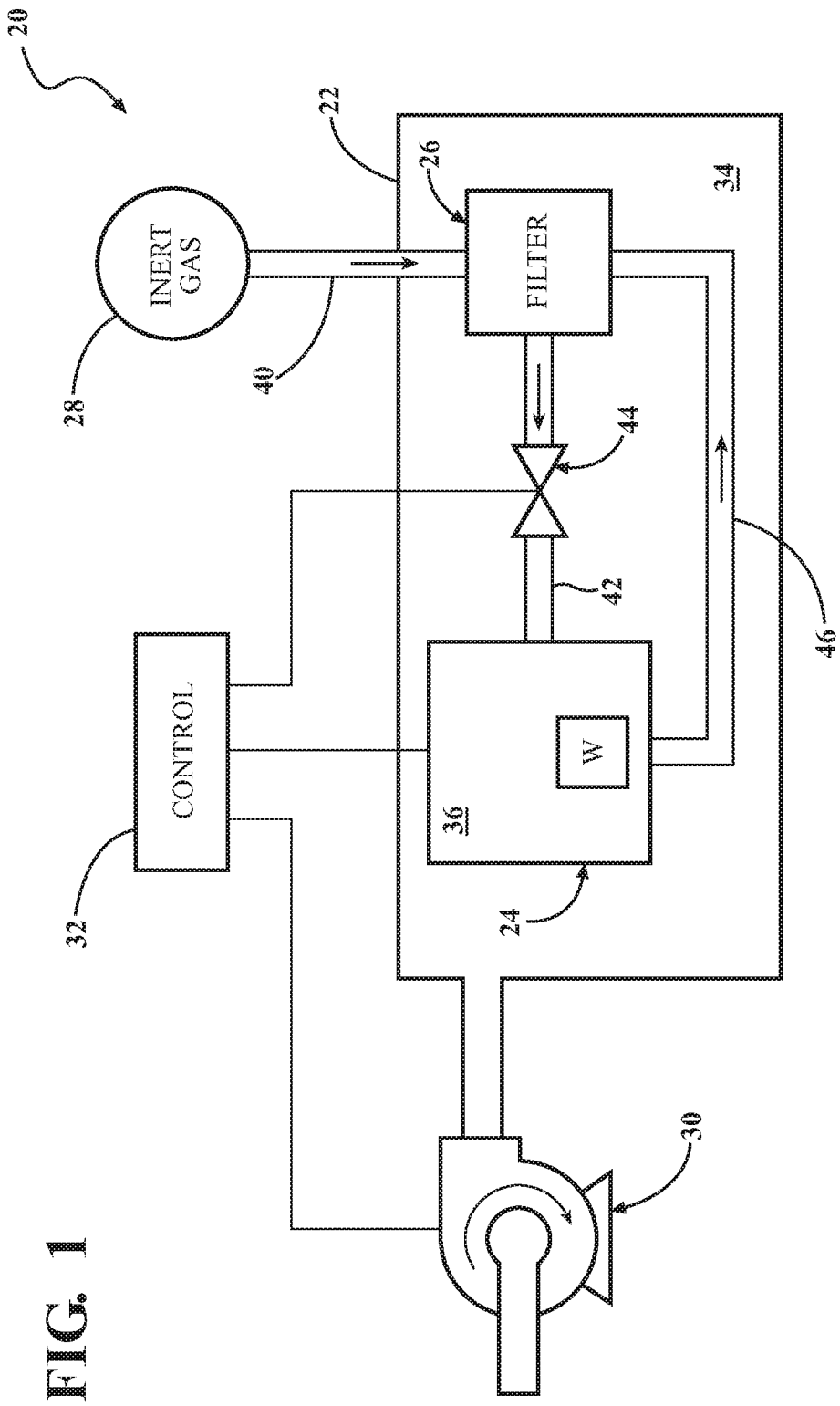
FIG. 1 is a schematic cross-section of an Additive Manufacturing (AM) machine.

FIG. 1 schematically illustrates an Additive Manufacturing (AM) system 20. The Additive Manufacturing system 20 generally includes a containment housing 22, a build housing 24, a filter system 26, an inert gas source 28, a pump system 30, and a control system 32. The containment housing 22 forms a containment chamber 34 with a low pressure operating atmosphere that surrounds at least a build chamber 36 formed by the build housing 24 where the additive manufactured workpiece W is additively manufactured. It should be appreciated that although particular systems are separately defined, each or any of the systems may be otherwise combined or separated via hardware and/or software.

The additive manufacturing technique, such as, but not limited to, laser powder bed, laser free form fabrication, laser powder deposition, cold spray, etc. that operate under a positive pressure generated by the inert gas source 28 is performed in the build chamber 36. The inert gas includes, but is not limited to, argon, nitrogen, etc. In one example, the inert gas is supplied at about ten liters per minute.

The containment chamber 34 is at a low pressure operating atmosphere generated by the pump system 30 under control of the control system 32. In one example, the operating atmosphere may be about $10^{-2}$ to $10^{-3}$ torr pressure.

The containment housing 22 facilitates the effective removal of atmospheric contamination from within the build chamber 36. In one disclosed non-limiting embodiment, the build housing 24 and associated filter system 26 are contained within the containment housing 22. The containment housing 22 thus contains one or more build chambers 34 of the additive manufacturing machines that results in higher quality workpieces W and less inert gas consumption. It should be appreciated that various other systems, that may be a source of contamination, such as the filter system 26, or components thereof, may be located within the containment housing 22. Additionally, it is relatively less difficult to repair a leak in the relatively less complicated containment housing 22 rather than in the relatively complex build housing 24 due to the complexity thereof.

The filter system 26 receives the inert gas from the inert gas source 28 through an inlet conduit 40 that extends though the containment housing 22. From the inert gas flow filter system 26, the inert gas is communicated into the build chamber 36 though a conduit 42 having a valve 44 to assure a clean environment for additive manufacturing. The valve 44 may be operated in response to the control system 32 to control the flow of the inert gas. The inert gas provides an inert gas environment within the build chamber 36 and is exhausted through a conduit 46 back to the filter system 26. During the laser melting a contaminated inert gas "gas condensate" or a mixture of inert gas, the products of metal powder melting/evaporating, and also a product of burning out of powder impurities is recycled through the filter system. It should be appreciated that various communication paths may alternatively, or additionally, be provided.

Figure 2:
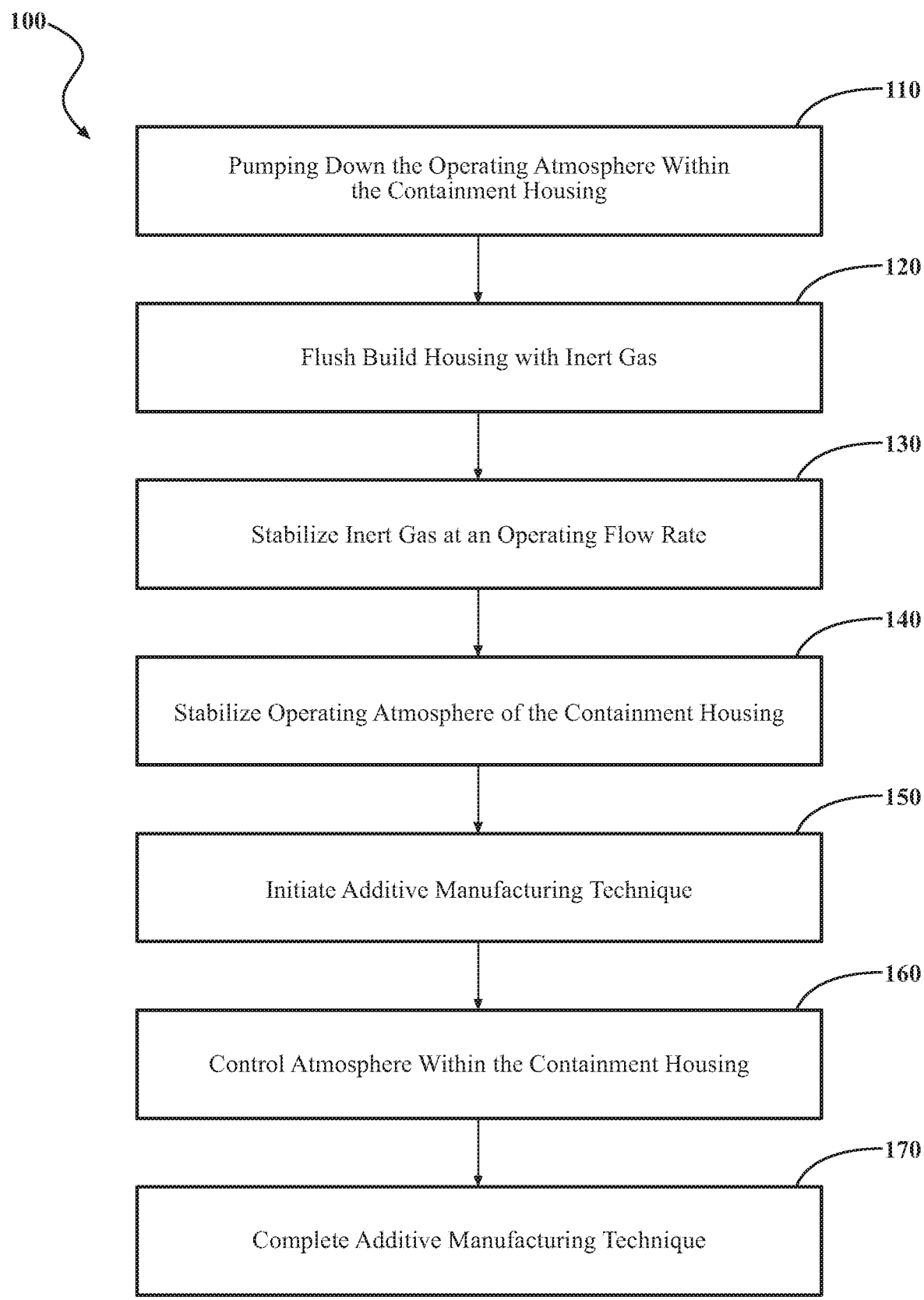
FIG. 2 is a flow chart depicting operation of the Additive Manufacturing (AM) machine.

With reference to FIG. 2, a method 100 of operating the system 20 initially includes pumping down the operating atmosphere within the containment housing 22 to, for example, about $10^{-3}$ to $10^{-4}$ torr partial pressure (step 110).

Next, the build housing 24 is flushed with inert gas from the inert gas source 28 until the build chamber 36 reaches desired low oxygen content (step 120). In one example, about 200 ppm (part per million).

Next, the inert gas flow into the build chamber 36 is stabilized at an operating flow rate (step 130). The operating atmosphere of the containment housing 22 is then stabilized at the operating atmosphere (step 140) that, for example, may be about $10^{-2}$ to $10^{-3}$ torr partial pressure.

Next, the additive manufacturing technique is initiated (step 150). The additive manufacturing technique facilitates manufacture of the relatively complex components to minimize assembly details and multi-component construction. The additive manufacturing process fabricates or "grows" components using three-dimensional information, for example a three-dimensional computer model. The three-dimensional information is converted into a plurality of slices, each slice defining a cross section of the component for a predetermined height of the slice. Although particular additive manufacturing processes are disclosed, it should be appreciated that any other suitable rapid manufacturing method using layer-by-layer construction or additive fabrication can alternatively be used.

During performance of the additive manufacturing technique, the operating atmosphere within the containment housing 22 is controlled by operation of the pump system 30 in response to the control system 32. That is, the performance of the additive manufacturing technique may change the pressure within the containment housing 22 and is compensated therefore based on, for example, the type of workpiece material being additively manufactured (step 170).

By effectively removing atmospheric contamination from within and around the additive manufacturing machine(s), the build chamber 36 will provide higher quality builds and less inert gas consumption. It is also relatively easier to find and fix a housing leak than build chamber leak due to complexity thereof.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft,"

"upper," "lower," "above," "below," and the like are with reference to the normal operational attitude and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

The invention claimed is:

1. An additive manufacturing system, comprising:
a containment housing with a low pressure operating atmosphere containment chamber;
a multiple of additive manufacturing build chambers within said containment housing, said containment chamber completely contains an additive manufacturing build housing that defines said multiple of additive manufacturing build chambers, said multiple of additive manufacturing build chambers contains a positive pressure therein greater than said low pressure operating atmosphere; and
a filter system in communication with said build housing; and
an inert gas source to communicate said inert gas into said build housing, said filter system within said containment chamber.

2. The additive manufacturing system as recited in claim 1, wherein said containment housing is configured to provide the low pressure operating atmosphere is about $10^{-2}$ to $10^{-4}$ torr partial pressure.

3. The additive manufacturing system as recited in claim 1, wherein said containment housing is configured to provide the low pressure operating atmosphere is about $10^{-3}$ to $10^{-4}$ torr partial pressure.

4. The additive manufacturing system as recited in claim 3, wherein said build chamber receives an inert gas flow.

5. The additive manufacturing system as recited in claim 4, wherein said inert gas flow is about 10 liters per minute.

6. A method of operating an additive manufacturing system, comprising:
additively manufacturing within a multiple of additive manufacturing build chambers, the multiple of additive manufacturing build chambers within a containment housing having a low pressure operating atmosphere, said low pressure operating atmosphere is about $10^{-2}$ to $10^{-4}$ torr partial pressure; and
compensating for a change in the pressure within the containment housing in response to a change in pressure in at least one of the multiple of additive manufacturing build chambers.

7. The method as recited in claim 6, wherein the additive manufacturing build chamber is formed within an additive manufacturing build housing, the additive manufacturing build housing completely contained within the containment housing.

8. The method as recited in claim 7, further comprising communicating an inert gas into the additive manufacturing build housing, a positive pressure build chamber within said additive manufacturing build housing greater than said low pressure operating atmosphere.

* * * * *